United States Patent
Grossman et al.

(10) Patent No.: US 9,626,386 B2
(45) Date of Patent: *Apr. 18, 2017

(54) AUTOMATED SPIRITUAL RESEARCH, REFLECTION, AND COMMUNITY SYSTEM AND METHOD

(71) Applicants: Andrew Grossman, Hopkins, MN (US); Kenneth F. Krutsch, Minnetonka, MN (US); Richard Monson-Haefel, Edina, MN (US); Clayton Darwin, Corner, GA (US)

(72) Inventors: Andrew Grossman, Hopkins, MN (US); Kenneth F. Krutsch, Minnetonka, MN (US); Richard Monson-Haefel, Edina, MN (US); Clayton Darwin, Corner, GA (US)

(73) Assignee: Ambient Consulting, LLC, Minneapolis, MN (US)

( * ) Notice: Subject to any disclaimer, the term of this patent is extended or adjusted under 35 U.S.C. 154(b) by 813 days.

This patent is subject to a terminal disclaimer.

(21) Appl. No.: 13/832,249

(22) Filed: Mar. 15, 2013

(65) Prior Publication Data
US 2014/0279923 A1    Sep. 18, 2014

(51) Int. Cl.
*G06F 17/30* (2006.01)

(52) U.S. Cl.
CPC .............. *G06F 17/30289* (2013.01)

(58) Field of Classification Search
CPC ............ G06F 17/211; G06F 17/30873; G06F 17/30867; G06F 17/30731; G06F 17/30575

(Continued)

(56) References Cited

U.S. PATENT DOCUMENTS 7,984,380 B2 *   7/2011   Mindrum .............. G06F 17/211
                                                             715/204
8,323,027 B2    12/2012   George
                          (Continued)

OTHER PUBLICATIONS

Dec. 22, 2015 USPTO Office Action (U.S. Appl. No. 13/833,340)—Our Matter 4964.

(Continued)

*Primary Examiner* — Jean M Corrielus
(74) *Attorney, Agent, or Firm* — Beck Tysver Evans, PLLC

(57) ABSTRACT

A computerized system and method are presented that provide access to three data collections that can form the foundations of a spiritual journey, namely a research archive for researching fundamental texts of a variety of spiritual and religious domains, a personal reflection data collection for reflecting upon a personal life journey, and a community conversation data collection that provides users with an opportunity to explore the research archive and their personal reflections in a social community setting. The research archive is oriented around ideas having snippets from the fundamental texts. The various elements in the data collections are associated with life issue tags and religious or spiritual domains. By analyzing a user's selected domain or the domain of displayed content, and by analyzing the life issue tag associated with displayed content, the system and method can suggest related content from elsewhere in the data collections.

18 Claims, 10 Drawing Sheets

(58) Field of Classification Search
USPC ....... 715/776, 739, 204, 738, 751, 733, 810; 707/769, 661, 776, 751, 733, 810; 709/204
See application file for complete search history.

(56) References Cited

U.S. PATENT DOCUMENTS

| | | | |
|---|---|---|---|
| 9,183,291 B2* | 11/2015 | Brown | G06F 17/30731 |
| 2002/0004792 A1 | 1/2002 | Busa | |
| 2002/0032735 A1* | 3/2002 | Burnstein | G06F 17/30867 |
| | | | 709/204 |
| 2002/0103876 A1 | 8/2002 | Chatani et al. | |
| 2002/0168664 A1 | 11/2002 | Murray et al. | |
| 2004/0083092 A1 | 4/2004 | Valles | |
| 2005/0144042 A1 | 6/2005 | Joffe et al. | |
| 2005/0287505 A1 | 12/2005 | George | |
| 2006/0242309 A1 | 10/2006 | Damick et al. | |
| 2007/0088695 A1 | 4/2007 | Bleyendaal et al. | |
| 2008/0154883 A1* | 6/2008 | Chowdhury | G06F 3/0482 |
| 2008/0208606 A1 | 8/2008 | Allsop et al. | |
| 2009/0019310 A1 | 1/2009 | Nastacio et al. | |
| 2009/0100369 A1* | 4/2009 | Mindrum | G06F 17/211 |
| | | | 715/776 |
| 2009/0230668 A1* | 9/2009 | Andres | B42D 1/009 |
| | | | 281/16 |
| 2009/0240671 A1 | 9/2009 | Torres et al. | |
| 2009/0248399 A1 | 10/2009 | Au | |
| 2009/0299988 A1 | 12/2009 | Hamilton, II et al. | |
| 2009/0319338 A1* | 12/2009 | Parks | G06Q 10/0639 |
| | | | 705/7.38 |
| 2010/0050118 A1* | 2/2010 | Chowdhury | G06F 3/0482 |
| | | | 715/810 |
| 2010/0101004 A1* | 4/2010 | Ragsdale, III | A41D 27/08 |
| | | | 2/244 |
| 2010/0114937 A1* | 5/2010 | Hawthorne | G06Q 30/02 |
| | | | 707/769 |
| 2010/0179950 A1* | 7/2010 | Willcock | G06Q 10/00 |
| | | | 707/723 |
| 2010/0198627 A1 | 8/2010 | Moed | |
| 2011/0055713 A1* | 3/2011 | Gruenewald | G06Q 10/00 |
| | | | 715/738 |
| 2011/0065079 A1* | 3/2011 | Boswell | G06F 7/588 |
| | | | 434/245 |
| 2011/0258552 A1* | 10/2011 | White | G06Q 10/10 |
| | | | 715/739 |
| 2012/0110458 A1* | 5/2012 | Brown | G06F 17/30575 |
| | | | 715/733 |
| 2012/0233253 A1* | 9/2012 | Ricci | G06Q 50/01 |
| | | | 709/204 |
| 2012/0324337 A1* | 12/2012 | Mbenkum | G06F 17/241 |
| | | | 715/234 |
| 2012/0324392 A1* | 12/2012 | Mbenkum | G06F 17/30873 |
| | | | 715/776 |
| 2012/0324393 A1* | 12/2012 | Mbenkum | G06Q 50/01 |
| | | | 715/776 |
| 2013/0132284 A1* | 5/2013 | Convertino | G06Q 10/103 |
| | | | 705/300 |
| 2013/0171610 A1* | 7/2013 | Andres | G09B 5/00 |
| | | | 434/365 |
| 2013/0227429 A1* | 8/2013 | Sivadas | G06Q 10/00 |
| | | | 715/751 |
| 2013/0332952 A1* | 12/2013 | Anandpura | H04N 21/44 |
| | | | 725/34 |

OTHER PUBLICATIONS

Feb. 29, 2016 USPTO Office Action (U.S. Appl. No. 13/834,065)—Our Matter 4965.
Apr. 8, 2015 USPTO Office Action (U.S. Appl. 13/833,340)—Our Matter 4964.
Jun. 14, 2015 USPTO Office Action (U.S. Appl. No. 13/834,065)—Our Matter 4965.
Afterlife, Spiritual Science Research Foundation, Bridging the Known and Unknown Worlds, 2012.
Causes of Problems in Life, Spiritual Science Research Foundation, Life, Death and Afterlife, 2012.
Open Bible, Crossway Bible, Good News Publishers, retrieving from Internet, 2001.

* cited by examiner

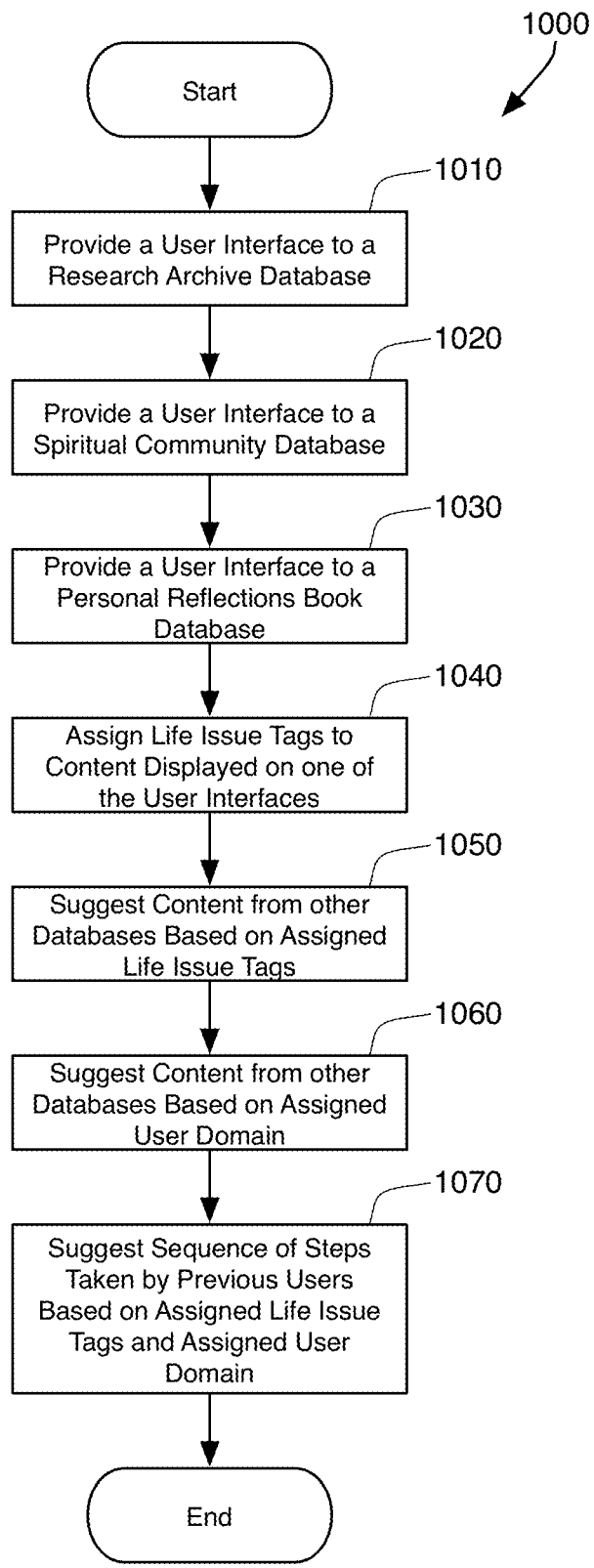

AUTOMATED SPIRITUAL RESEARCH, REFLECTION, AND COMMUNITY SYSTEM AND METHOD

FIELD OF THE INVENTION

The present application relates to the field of computerized systems that automate the process of spiritual research and recordation of a personal spiritual journey.

SUMMARY

An embodiment of the present invention provides one or more server computer systems that provide access to three data collections that can form the foundations of a spiritual journey. The server computer systems provide access to a research archive for researching fundamental texts of a variety of spiritual and religious domains. The computer systems also provide an ability to plan, record, and reflect upon a personal life journey in a form that can be passed on to future generations. Finally, the computerized systems provide a communal setting that provides an opportunity to explore the contents of the research archive and their personal reflections in a social community setting. These three supporting foundations can be implemented in one or more structured, computer-managed databases presented to remote users through a computerized interface to the databases.

BRIEF DESCRIPTION OF THE DRAWINGS

FIG. 10 is a flow chart showing a method of using one embodiment of the present invention.

DETAILED DESCRIPTION

System Overview

Figure 1:
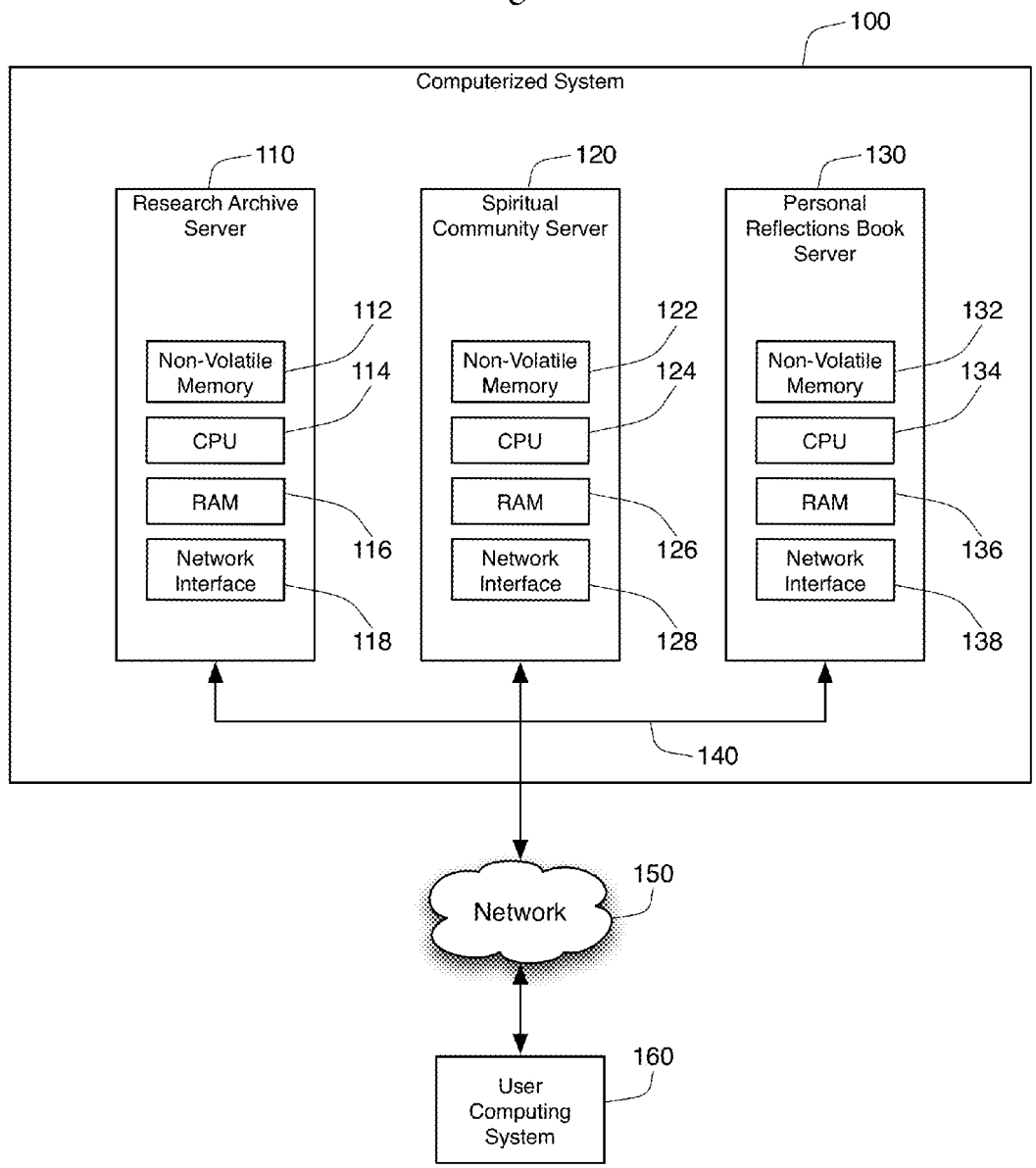
FIG. 1 is a schematic diagram showing the major elements of one embodiment of the present invention.

FIG. 1 shows the major elements of a system 100 that can implement the present invention. In the embodiment shown in FIG. 1, the computerized system 100 utilizes three separate server systems, namely an archive server 110, a spiritual community server 120, and a personal reflections book server 130. Each of these servers 110, 120, 130 uses a set of software instructions or interfaces stored on a non-volatile, non-transitory, computer readable medium 112, 122, 132, respectively, such as a hard drive or flash memory device. A programmable digital processor 114, 124, 134, such as a general purpose CPU manufactured by Intel Corporation (Mountain View, Calif.) or Advanced Micro Devices, Inc. (Sunnyvale, Calif.), accesses and performs the software. To improve efficiency, the processors 114, 124, 134 may load software stored in memory 112, 122, 132 into faster, but volatile RAM 116, 126, 136. Data operated upon by the software can also be stored in non-volatile memory 112, 122, 132 and retrieved into RAM 116, 126, 136 for analysis, recording, and reporting. The software typically includes operating system software, such as LINUX (available from multiple companies under open source licensing terms) or WINDOWS (available from Microsoft Corporation of Redmond, Wash.).

Each of the server systems 110, 120, 130 further includes a network interface 118, 128, 138 to communicate with other computerized devices across the digital data network 150. In one embodiment, the network 150 is wide area network such as the Internet or a TCP/IP-based Intranet, and the network interfaces 118, 128, 138 each include TCP/IP protocol stacks for communicating over the network 150. The network interfaces 118, 128, 138 may connect to the network 150 wirelessly or through a physical wired connection. The network interfaces 118, 128, 138 can also be used to provide communication between the servers 110, 120, 130, such as over a local area network 140.

The computerized system 100 is shown in FIG. 1 as three separate server systems 110, 120, 130 to emphasize the distinct services provided by each of these systems 110, 120, 130. Each of these separate server systems 110, 120, 130 can be implemented on a single computer with a single processor 114, 124, 134. Alternative, each server system 110, 120, 130 could also implemented using a network of computers all operating according to the instructions of the software. In fact, the system 100 could easily be implemented on a single computer system using one or more processors.

The computerized system 100 provides access to data on the servers 110, 120, 130 over the network 150 to a user computer system 160. The user computer system 160 could be similar in construction to the server systems 110, 120, 130 that make up system 100, utilizing a general-purpose processor such as those provided by Intel Corporation or Advanced Micro Devices. Alternatively, the user computer system 160 could be a portable computing device such as a tablet computer or smart phone. These kinds of devices generally use specific operating systems designed for mobile devices, such as iOS from Apple Inc. (Cupertino, Calif.) or ANDROID OS from Google Inc. (Menlo Park, Calif.), and also frequently use mobile specific processors, such as those designed by ARM Holdings (Cambridge, UK).

Each server system 110, 120, 130 manages a database and provides interfaces to the database to one or more user computing systems 160 over the network 150. The archive server 110 contains data about spiritual texts and life issues. This data is sometimes referred to herein as the "research archive." The spiritual texts are taken from a variety of spiritual and religious beliefs referred to herein as domains. One of the primary data elements maintained by the archive server 110 is an "idea." Each idea contains or refers to a snippet or quotation from a spiritual text that is considered a foundational text for one of the domains of the research archive. Each idea also contains or refers to a set number of commentaries on the snippet. The commentaries are written from the point of view of a particular domain, and each commentary is written in the context of a particular approach to that domain. Furthermore, each idea approaches the snippet of text in the context of a particular life issue. Life issues are organized as tags within a life issue tag hierarchy maintained by the archive. This is described in more detail below in connection with FIGS. 2 and 3.

The spiritual community server 120 provides a social networking space to the user computer 160 organized around community spaces. Community spaces may have closed memberships to outsiders, creating social networking areas that are open only to a defined constituency. Examples include clergy spaces that are open only to clergy of a particular denomination and congregational spaces open only to known members of a spiritual congregation. Members of these communities use the spiritual community server 120 to engage with each other over spiritual issues.

The personal reflections book server 130 provides the user computing device 160 with the resources necessary to plan, document, and contemplate a personal life journey. The personal reflections book server 130 allows a user to record thoughts and actions, and plan for future actions and deeds. The personal reflections book server 130 is deeply integrated into the archive provided by the archive server 110, allowing research into the archive to place meaning on the events and beliefs recorded through the personal reflections book server 130.

The computer system 100 monitors users in all three aspects of the system 100. This allows the system 100 to track behavior and movement within the system, and to present suggestions for consideration by the users. A user struggling with a life issue using the personal reflections book server 130 could be identified by the system 100, and related ideas from the archive server 110 could be suggested to the user. Alternatively, the system could recommend conversations or other interactions maintained by the spiritual community server 120 that are related to that struggle. Paths taken by a user through the system 100 can be recorded, and outcomes of various struggles, decisions, and life events could be determined. This data could be aggregated to remove personally identifying information and then shared with other users, researchers, and educational and spiritual institutions.

Archive Server

Figure 2:
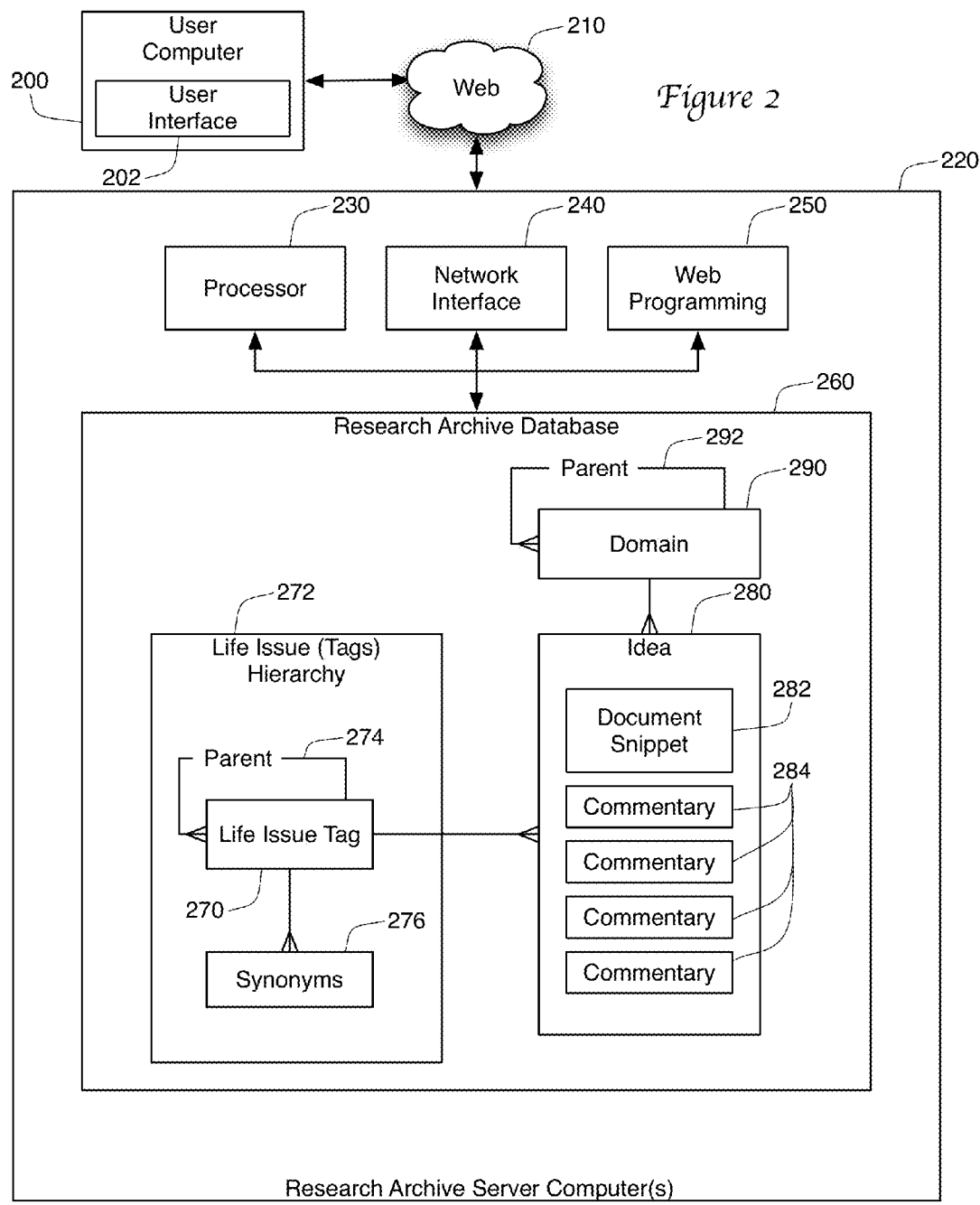
FIG. 2 is a schematic diagram showing the major components of an archive server computer.

The archive server 110 of FIG. 1 can be implemented as one or more web server computers 220 communicating with a user computer 200 over the World Wide Web 210, as shown in FIG. 2. The archive server computer 220 uses a processor 230, a network interface 240, and web programming 250 to provide web-based user interfaces such as user interface 202 over the web 210. The user interface 202 provides the ability to access the research archive that is stored and managed by the archive server 220. The research archive is also accessed and used by the spiritual community server 120 and the personal reflections book server 130.

In the preferred embodiment, the archive server computer 220 stores the research archive in a structured database 260. The archive can be maintained as separate tables in a relational database, or as database objects in an object-oriented database environment. The database 260 is stored in the memory of the research archive server computer 220 as data and related database programming. The database programming directs the processor 230 to access, manipulate, update, and report on the data in the database 260 as further described herein. FIG. 2 shows the database 260 with tables or objects for a life issue tags 270, ideas 280, and domains 290. The life issue tag database entity 270 contains an identifier and a description for a particular life issue that may face an individual, such as "marriage" or "death of a parent." The idea database entities 280 each contain a snippet or quotation 282 from a spiritual text that is considered a foundational document for one of the domains of the archive. The domains are categorizations of spiritual or religious bodies or groups of believers, such as Sufism, Southern Baptist, or Catholic. Domains are identified through the domain database entity 290. Each idea 280 contains a set number of commentaries 284 on the snippet 282. The commentaries 284 are written from the point of view of a particular domain 290. Consequently, each idea 280 is related to only a single domain 290, while multiple ideas 280 can exist for a single domain 290. Each of the set number of commentaries 284 in an idea 280 are written in the context of a particular approach to the related domain 290. For instance, four commentaries 284 on the snippet 282 could be written from the point of view of i) a traditional approach within that domain, ii) a moderate approach within the domain, iii) a historical analysis approach within the domain, and iv) a modern approach within the domain. In the preferred embodiment, all ideas 280 in the archive contain the same number of commentaries 284 (such as four, six, or eight) on the snippet 282, with the commentaries 284 all written from the same four (or six or eight) different points of view. Furthermore, each idea 280 approaches the snippet 282 in the context of a particular life issue 270.

Figure 3:
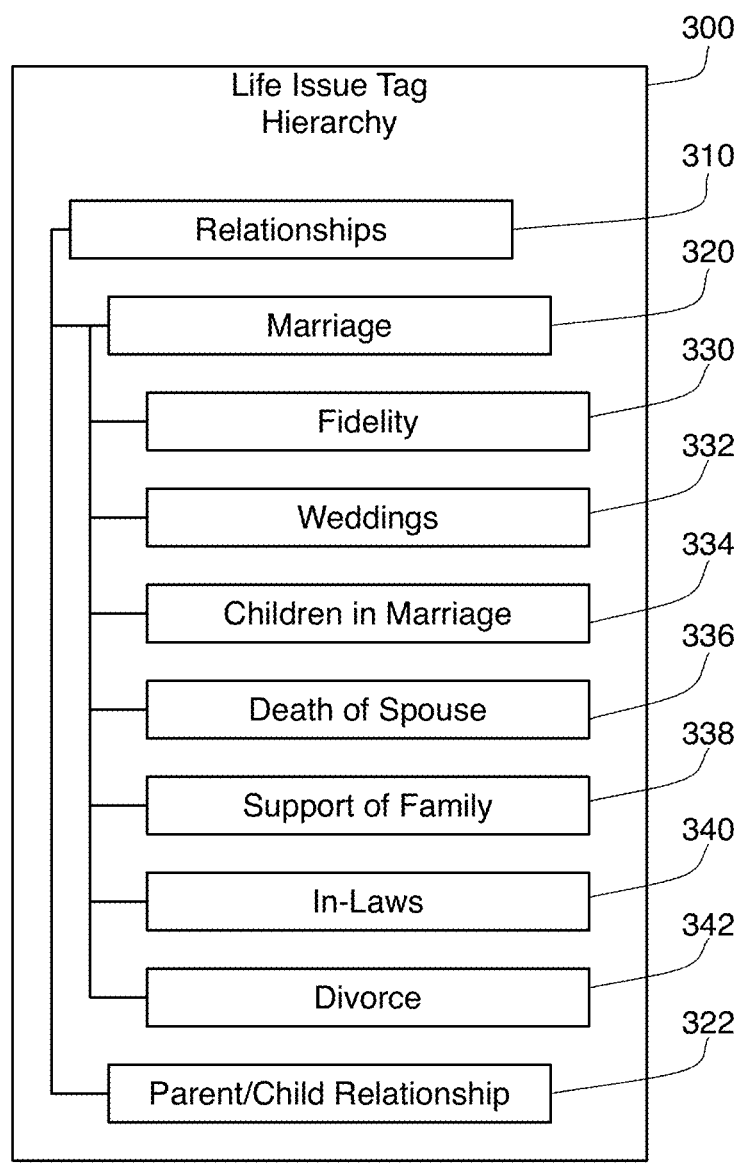
FIG. 3 is a schematic diagram showing a portion of a hierarchy of life issue tags.

The life issue tags 270 are organized within a life issue tag hierarchy 272 maintained by the archive database 260. This means that each tag 270 may be assigned a parent tag 270, with individual tags 270 possible having a parent tag 270, one or more sibling tags 270, and one or more child tags 270. FIG. 3 shows one portion of an example life issue tag hierarchy 300. In this example, the parent tag 310 deals with the life issue of relationships. Two child tags 320, 322 of the relationships tag 310 are shown in FIG. 3, namely the marriage tag 320 and the parent/child relationship tag 322. The marriage tag 320 is itself shown with seven child tags 330-342, namely a fidelity tag 330, a weddings tag 332, a children in marriage tag 334, a death of a spouse tag 336, a support of family tag 338, an in-laws tag 340, and a divorce tag 342. In this hierarchy 300, the marriage tag 320 has one parent tag 310, one sibling tag 322, and seven child tags 330-342. The fidelity tag 330 has one grandparent tag 310, one parent tag 320, and six sibling tags 332-342. The parent 320 and grandparent tag 310 can both be considered ancestor tags of the fidelity tag 330. Similarly, all of the tags assigned reference numerals 320-342 are progeny tags of the relationship tag 310.

In one embodiment, every tag 310-342 has only a single parent tag and therefore is found in only one location in the hierarchy 300. In other embodiments, a single tag 330-342 may have multiple parents and can therefore be duplicated at multiple locations in the hierarchy 300. For example, the death of a spouse tag 336 could be a child tag to the marriage life issue tag 320, and could also be a child tag to a "death" life issue tag (not shown in FIG. 3). In some embodiments, every time a data element is associated with a life issue tag 270 it is automatically associated with the parent of that life issue tag 270, or even all ancestors of that tag 270. For instance, content assigned to the in-laws tag 340 would automatically be assigned to the marriage tag 320 and the relationship tag 310.

To make it easier to identify a relevant life issue tag 270, the research archive database 260 can assign one or more synonyms 276 to each life issue tag 270. This allows the user interface 202 to accept a key word search for a particular life issue tag 270. The content of the life issue tag entities 270 and the synonym entities 276 can then be searched for occurrences of those key words. If the key words were not found in the title or description of any of the life issue tags 270 but were found in the synonyms 276, the appropriate life issue tags 270 could still be identified by identifying the life issue tags 270 associated with the found synonyms 276.

Relationships between the database entities 270, 276, 280, and 290 in the database 260 are represented in FIG. 2 using crow's foot notation. For example, FIG. 2 shows that a life issue tag 270 may be related to (or "associated with") multiple ideas 280, but each idea 280 is associated with only a single life issue tag 270. Similarly, a single spiritual domain 290 will be associated with multiple ideas 280, with each idea 280 having a snippet 282 from a spiritual text identified with that domain 290, along with commentaries 284 written about that snippet 282 from the context of that domain 290. Each idea 280, and therefore each of the commentaries 284 within that idea 280, is associated with a single domain 290 (i.e., Catholic) and a single life issue tag 270 (i.e., marriage). For example, if the document snippet 282 were a chapter from the book of 1 Corinthians, the domain 290 were Catholic, and the life issue tag 270 were marriage, the fixed number (i.e. four) commentaries 284 in the idea 280 would all comment on how the 1 Corinthians chapter relates to marriage from the Catholic perspective. As explained above, the commentaries 284 would discuss this issue from pre-established points-of-view, such as traditional, moderate, and modern approaches, and through a historical analysis. Associations or relationships between database entities 270-290 can be implemented through a variety of known database techniques, such as through the use of foreign key fields and associative tables in a relational database model.

The establishment of the life issue hierarchy 272 is made possible by the parent relationship 274. It is to be understood that the hierarchy 272 could be created with a child relationship instead of a parent relationship 274, or by using both child and parent 274 relationships. The parent relationship 292 of the domain database entity 290 shown in FIG. 2 indicates that the domains 290 can also be assigned parents, and therefore have parent, sibling, and children domains 290.

One benefit of this construction of the archive database 260 is that it is possible to research the ideas 280 and document snippets 282 by identifying a tag or tags 270 of interest. By selecting one or more religious or spiritual domains 290, ideas 280 from that domain 290 that are relevant to the life issue tag 270 are presented through the user interface 202. The ideas 280 in the archive database 260 can then be traversed through the life issue tag hierarchy 272.

Of course, the table or object entities shown in FIG. 2 should not be considered to show actual implementation details of the database 260, since it is well within the scope of the art to implement this type of data using a variety of entity architectures. The entities shown are exemplary, intended to aid in the understanding of the data maintained by the system database 260 in this embodiment. For example, it would be well within the scope of the present invention to divide each idea 280 into multiple tables or objects that are linked together through database relationships, instead of as a single database entity 280 containing a document snippet 282 and commentaries 284. It is not even necessary to implement these entities as formal tables or objects, as other database paradigms could also effectively implement these types of data structures. Throughout the remainder of this disclosure, the content and interrelationship of database structures will continue to be explored using example data structures, but these structures should not be considered to limit the way in which these databases can be constructed.

Spiritual Community Server

Figure 4:
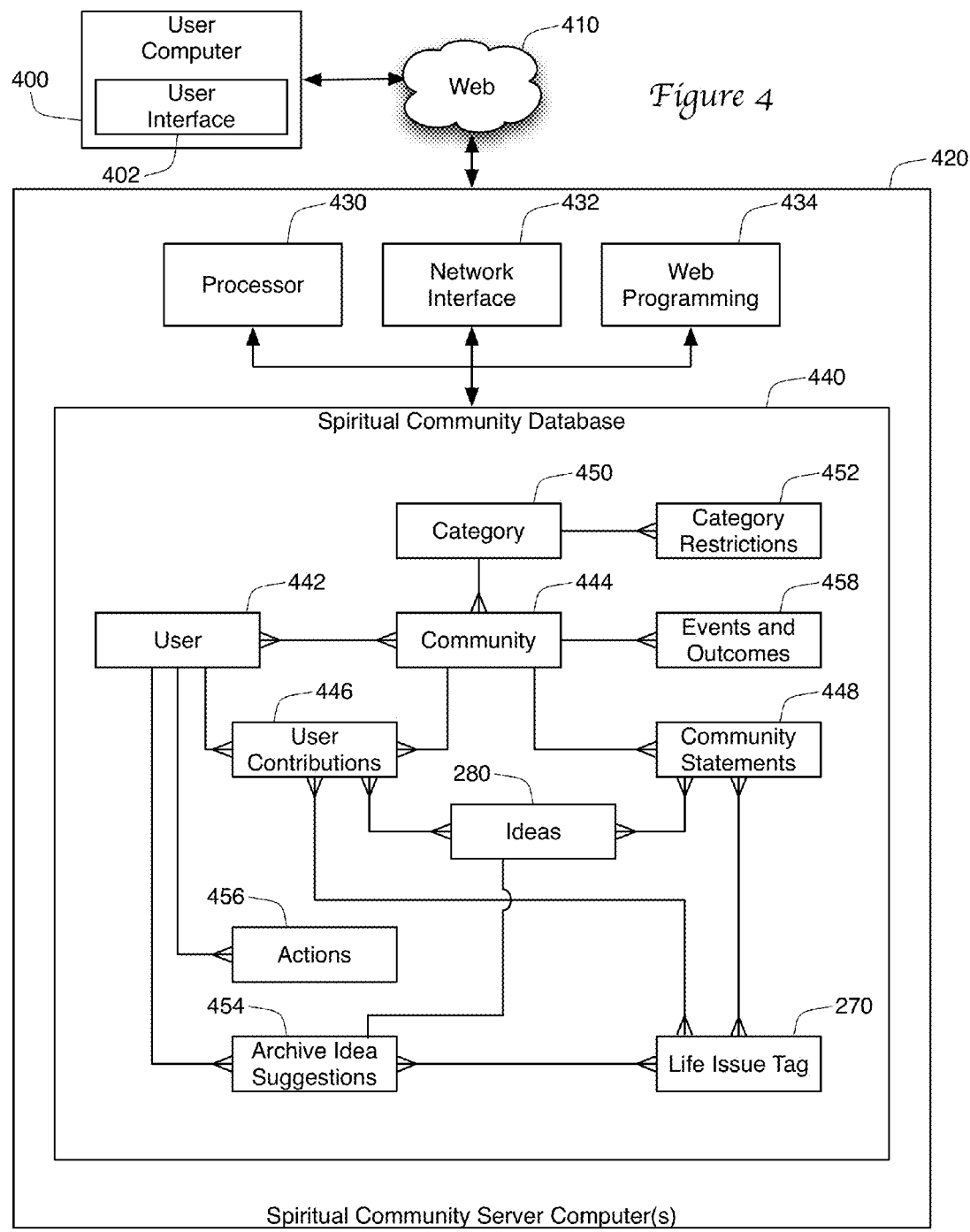
FIG. 4 is a schematic diagram showing the major components of a spiritual community server computer.

The spiritual community server 120 of FIG. 1 can also be implemented as one or more web server computers 420 communicating with a user computer 400 over the World Wide Web 410, as shown in FIG. 4. Like the archive server computer 220, the spiritual community server computer 420 uses a processor 430, a network interface 432, and web programming 434 to provide a web-based user interface 402 to the user computer 400 over the web 410. The user interface 402 provides the ability to access the social communities that are stored and managed by the spiritual community database 440.

This database 440 is structured like the archive database 260 into database entities linked through database relationships or associations. The spiritual community database 440 is shown in FIG. 4 as having numerous database entities 442-458. The user entity 442 is used to maintain and store information about individual users that utilize user computers 400 to access the system 100. The user entity 442 can store a username and password to control access to the spiritual community server computer 420 and even for the whole system 100. The user entity 442 may also contain personal and demographic information about the users, which can be useful for analyzing data for the user and about the user. In one embodiment, for instance, users self-identify as belonging to one or more spiritual domains (such as those stored in database entity 290), which allows the system 100 to tailor information accordingly. Preferences for use of the system 100 can also be stored in this entity 442 to allow each user to create a more customized experience while using the system 100.

Within the spiritual community database 440, each user 442 is associated with one or more communities 444, and each community 444 can be associated with more than one user 442. As the spiritual community server 420 is designed to provide a public exchange of information concerning spiritual issues and the content of the archive database 260 within communities, the assignment of users 442 to communities 444 is important to this experience. Users 442 participate by making user contributions 446 to the community 444. A user contribution 446 might be, for example, a message post on a message board, participation in a dialog with another user, the contribution of a photo, video or other content to a sharing location, or the sharing of a sermon with other clergy of the same denomination. User contributions 446 are associated with a single user 442, and are usually associated with the single community 444 to which the contribution 446 was made.

Sometimes leaders of a community 444 may wish to provide content to other members of the community 444, which can be accomplished using community statements 448. These statements 448 may include a statement of faith for a religious community, ethical rules for a law enforcement community, or the language of a bill for a community of lawmakers. Community-wide content 448 is not provided by an individual user 442 but by the community 444 as a whole or the leaders of the community 444. In some circumstances, the user 442 that created the user contribution 446 or users that create community statement 448 can control whether the contribution 446 or statement is available for public viewing by all users 442, or is only available to those users 442 that are members of that community 444. In other circumstances, pre-established rules for the community 444 determine how broadly such contributions 446 and statements 448 are shared, with these rules being changeable from community to community.

In the embodiment shown in FIG. 4, communities 444 are divided into categories 450. Example categories 450 include religious congregations, corporations, or educational institutions. One benefit of the use of categories 450 is that each category 450 of community 444 can have particular set of rules and restrictions 452 applied to it. For instance, the religious congregation category 450 may, by default, keep all community conversations private, meaning that only members of the community 444 can see the user contributions 446 that have been added to the community 444. Particular users 442 can be assigned particular roles within the community, such as a pastor, priest, or rabbi, or a church counsel member, and their ability to create community statements 448 and change restrictions for the community 444 may be based on these roles. Categories 450 with default category restrictions 452 therefore make it easier to create new communities with known roles and restrictions.

Life issue tags 270 and ideas 280, as discussed above in connection with the archive database 260, can be assigned to user contributions 446 and community statements 448. The user 442 or community 444 that created the item 446, 448 can manually assigning the tags 270 and ideas 280 to these items 446, 448. For instance, a church community 444 may wish to make a public statement on a particular life issue by creating a statement 448 and manually assigning it a life issue tag 270. Alternatively, the church 444 may wish to add its own commentary to an established idea 280 within the archive database 260 by creating a community statement 448 having this commentary and directly assigning the relevant idea 280 to their statement 448. Users can also comment on life issues and ideas by manually assigning life issue tags 270 and ideas 280 to their community contributions 446. In addition, some communities 444 may create community discussion groups around particular topics and invite members 442 to contribute contributions 446 to those groups. By assigning a life issue tag 270 (or an idea 280) to those community discussion groups, all related user contributions 446 will be associated with that tag 270 or idea 280.

While many users 442 and communities 444 may manually assign life issue tags 270 to their contributions 446 and community statements 448, it is also useful to automate the assignment of life issue tags 270 to these spiritual community database entities 446, 448. The system 100 accomplishes this by analyzing the text within the item 446, 448 when they are created, and then using key word and synonym analysis (using entities 276) to relate these items 446, 448 to a life issue tag 270. For instance, if a user contribution 446 relates to a discussion on the death of their spouse, the system 100 may automatically assign life issue tag 336 to this user contribution 446. In one embodiment, life issue tags 270 are assigned using natural language processing to detect the concepts or ideas that are present in the user's contribution 446, compare those concepts to the synonyms 276 in the research archive database 260, and then map matching synonyms 276 back to a life issue tag 270.

One of the primary benefits of monitoring user contributions 446 and assigning life issue tags 270 to such contributions 446 is that the system 100 is able to intelligently guide a user 442 and make suggestions relating to their use of the system 100. For instance, the system 100 may suggest that a user 442 who has commented on the death of their spouse review ideas 280 sharing the same life issue tag 270. These suggestions take the form of archive idea suggestions 454 in the diagram shown in FIG. 4. If the user 442 has identified a preferred domain (i.e., religious preference), the archive idea suggestions 454 may be limited to ideas sharing the same domain 290 (or a parent domain 290). If the user 442 has expressed a preference for a particular author of religious texts or a particular book (either explicitly by manually setting a preference or implicitly through their use of the system 100), the suggested ideas 454 could be narrowed down to meet the preferences of the user 442. In this way, a user 442 struggling with a life issue in the spiritual community database 440 can be provided guidance to information relevant to the issue and to their preferences that is found in the archive database 260.

The spiritual community database 440 is also set up to track actions 456 taken by users 442. For instance, if the user 442 is a politician in a political community 444 such as a legislative body, the actions 456 may include votes on a bill with ethical/religious implications, or public positions taken on controversial issues. Actions 456 may also include being elected or re-elected to office. While actions 456 track activities that relate to users 442, the events and outcomes database entity 458 track activities that relate to a community 444 as a whole. Such activities may include a church or a corporation taking a position on same-sex marriage, or a school deciding to stop teaching sex education. By tracking actions 456 of individual users 442 and events and outcomes 458 of communities 444 over time, the system 100 can gain valuable information on the impact particular decisions, statements, actions, and votes have on future events. For instance, a legislator from a liberal district may take a more moderate stand on school prayer and then be voted out of office in the next election, or a church can take a public stand on a controversial issue and then later report that it hired additional clergy to meet the demands of a growing congregation. This information could be useful to users 442 of the system 100 and therefore could be provided by the system when users contemplate or research similar issues. By assigning actions 456 and events/outcomes 458 to life issue tags 270, these relationships would be easy for the system 100 to identify and share with users and outside researchers and scholars who may be interested in this information.

Figure 5:
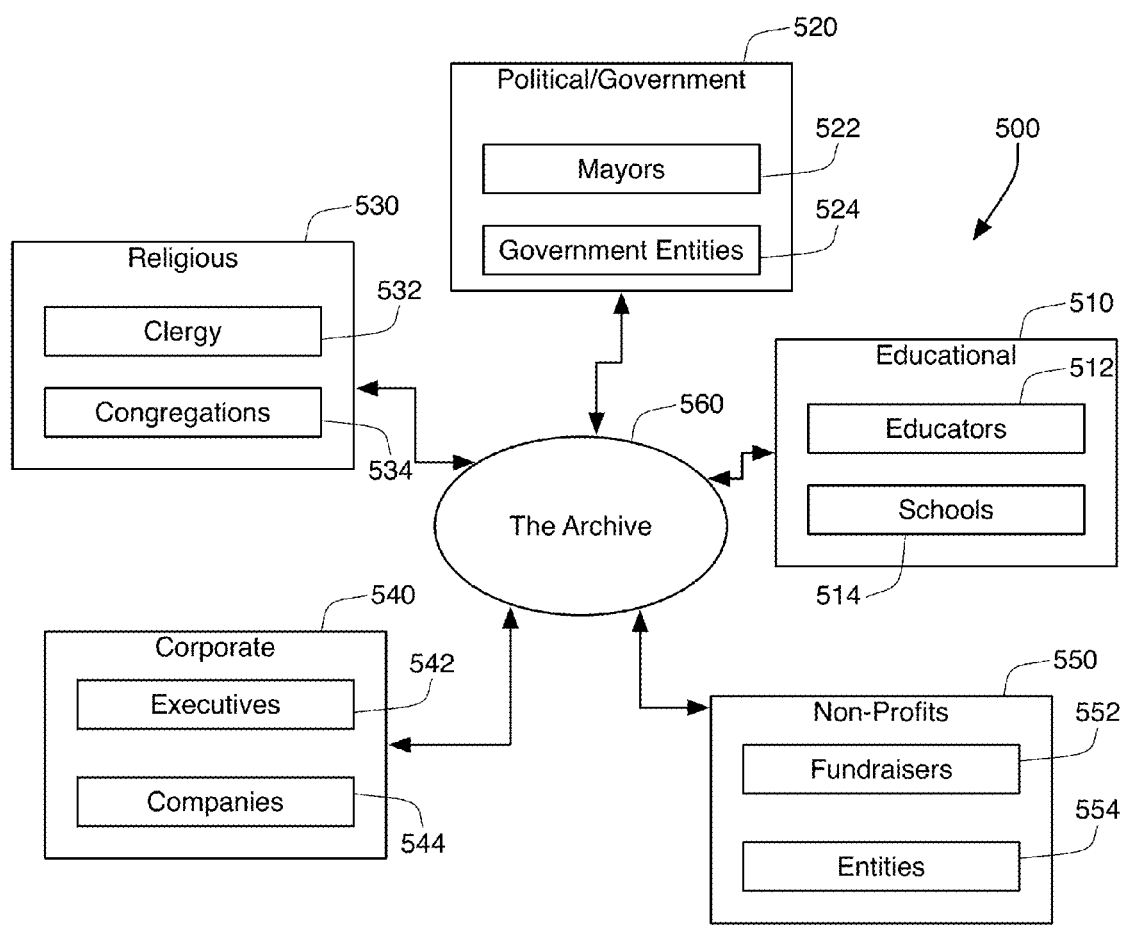
FIG. 5 is a schematic diagram showing the relationship between communities in the spiritual community and the archive.

FIG. 5 shows a system 500 having a variety of communities 510-554 hosted in the spiritual community database 440. These communities can be categorized roughly into educational communities 510, political or government communities 520, religious communities 530, corporate communities 540 and non-profit communities 550. In each of these categories 510-550 a variety of communities could be established. Some of these communities might be based around a specific organization. For instance, school communities 514 could be created that are maintained by a particular school. Students, educators, and parents of that school might all be members of that community. Similarly, government communities 520 may be based around government entities 524, religious communities 530 might be based around congregations 534, corporate communities 540 might be based around companies 544, and non-profit communities 550 might be based around non-profit entities 554. Other communities could be created around an individual's profession across organizations. For instance, a community of public kindergarten teachers 512 may be created as an educational group 510. Similarly, groups of mayors 522, clergy 532, for-profit executives 542, and non-profit fundraisers 552 may create their own communities. These communities may be closed, meaning that only users that attend a particular school or currently teach kindergarten in public schools are allowed as members. Of course, even closed communities may have some community statements 448 and user contributions 446 that are made available for viewing outside of the community.

In FIG. 5, all of these communities 510-554 are drawn around the research archive 560. This is because these communities 510-554 may all draw from the archive 560 during their community conversations, and the system 500 may analyze these conversations in light of the life issue tags 270 in the archive 560 and then suggest ideas 280 within the archive 560 for further analysis.

Personal Reflections Book Server

Figure 6:
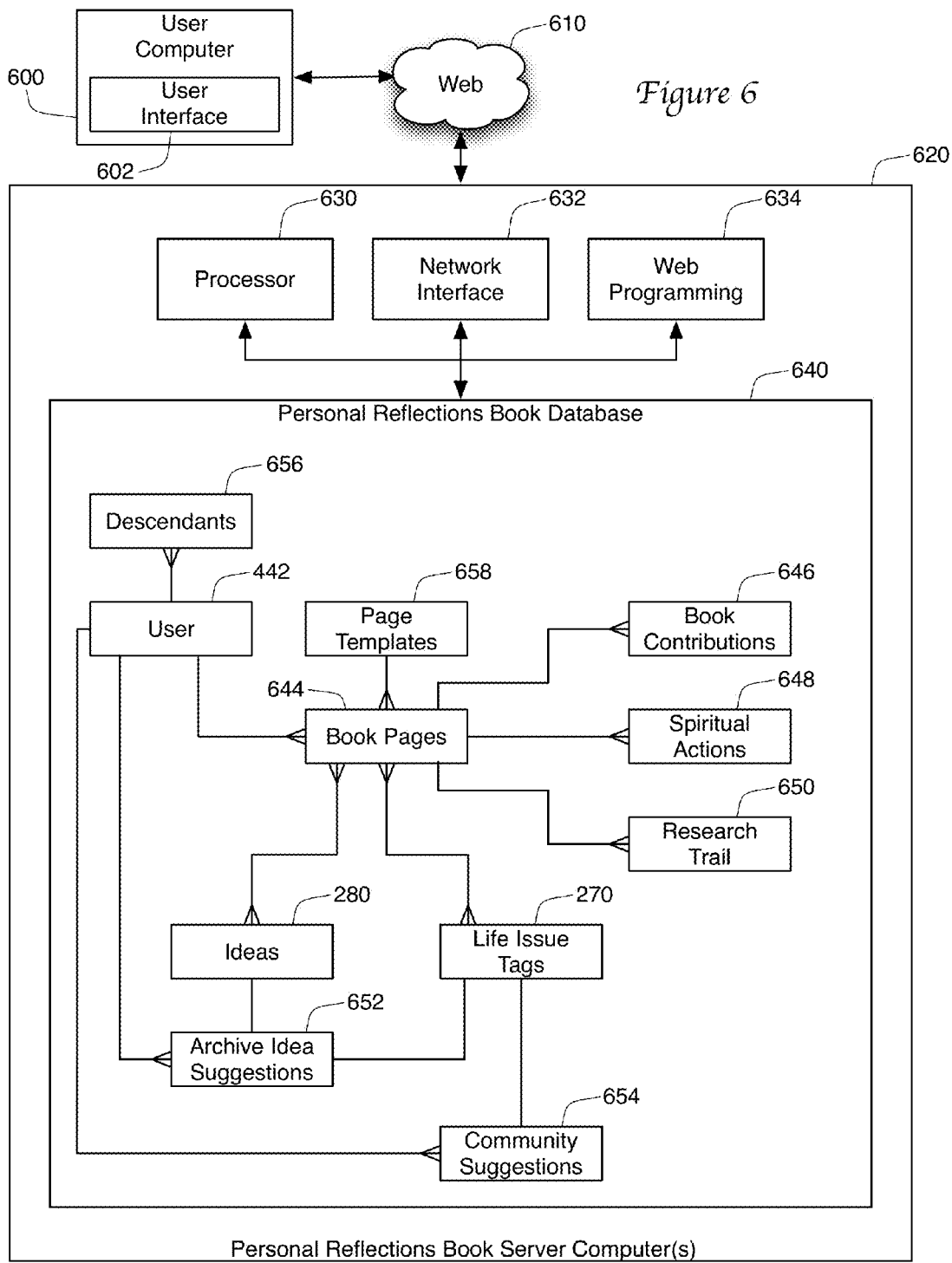
FIG. 6 is a schematic diagram showing the major components of a personal reflections book server computer.

Just like the research archive server 110 and the spiritual community server 120, the personal reflections book server 130 of FIG. 1 can also be implemented as one or more web server computers 620 communicating with a user computer 600 over the World Wide Web 610, as shown in FIG. 6. The personal reflections book server computer 620 also uses a processor 630, a network interface 632, and web programming 634 to provide a web-based user interface 602 over the web 610.

This web-based user interface 602 allows the user of computer 600 to access and manipulate the data stored in the personal reflections book database 640. The purpose of this database 640 is to allow users to store personal reflections about their own life journey, to record important events in their life, to plan and act upon their own spiritual goals, and to set down their thoughts on life in a way that can be reviewed and considered by future generations. While the personal reflections book server computer 620 is shown separate from the server computers for the spiritual community (420) and the research archive (220), they are described together in a single system 100 because of the benefits provided when all three systems 220, 420, 620 and their databases 260, 440, and 640 operate in conjunction with one another. They are also described as part of a single system 100 because all three systems 220, 420, and 620 could be implemented on a single computer system in some embodiments.

The personal reflections book database 640 maintains and updates information about the users of the server 620. In the preferred embodiment, user information in the personal reflections book database 640 is maintained in the same location as the user information 442 in the spiritual community database 440, and therefore is referred to using the same reference numeral 442. It would be well within the scope of the present invention for the user information to be stored separately in the two databases 440, 640.

In one embodiment, the personal reflections book database 640 presents its content through the user interface 602 using a book paradigm. Thus the user data 442 is associated within the database 640 with a plurality of book pages 644. These pages 644 may include journal entries, reflections, and other textual entries made by the user; photographs, video, or other audio/visual content selected or created by the user; research notes and research path histories related to use of the research archive database 260; spiritual actions and events in the user's past; spiritual paths, quests, and pilgrimages currently being undertaken by the user; and other types of entries that may be useful as one contemplates and plans a spiritual life journey. In one embodiment, each page 644 relates to a separate topic, such that all the contributions 646, 648, 650 that are assigned to a single page will share a single topic. Topics may include such items as "my relationship with my father," "my struggles with addiction," or "living in my home town." Even though the contributions that share a topic are all considered part of a single page 644 in the database 640, it is not necessary that the on-screen representation of that page 644 of data actually take on the appearance of a physical page in a book, or that all of the data appear on screen at once.

In the database 640, the book pages 644 are linked to the content that may appear within a page, such as book contributions 646 (which may include textual and audio/visual content from the user or from third parties using the system 100, or from outside the system 100), spiritual actions 648 (which may include a recordation of past actions and events in a user's life as well as an ability to plan and suggest future acts), and a research trail 650 (which records and reflects back the user's past use of the system 100). The research trail database entity 650 may track all of a user's use of the system 100 even if not all of this detail is reflected back to the user through a page 644 in the personal reflections book database 640.

It is anticipated that some of the personal reflections found in the book contributions 646 will relate directly to ideas 280 in the research archive database 260. Thus the personal reflections book database 640 is shown in FIG. 6 with idea database entities 280 being linked to book pages 644. These links can be created manually by users to indicate that a particular idea 280 in the archive is relevant to and should stay connected to a page 644 in their personal reflections book. Users can also manually assign life issue tags 270 to their personal reflections book pages 644. While this manual assignment of ideas 280 and life issue tags 270 to pages 644 can be helpful to users, the ability of the system 100 to automatically assign life issue tags 270 to book pages 644 is even more powerful. By analyzing text found on the book pages 644 (such as in the book contributions 646), and by comparing this text to the life issue tags 270 (and their descriptions and synonyms 276), the system 100 can identify life issue tags 270 for a particular page 644 without user intervention.

Once life issue tags 270 are assigned to a page 644, the system 100 can suggest new ideas 280 from the archive database 260. These suggested ideas are shown as separate element 652 in FIG. 6, but they need not actually be implemented as a separate database element 652 within database 640. In addition, the assignment of life issue tags 270 to a page 644 allows the system 100 to see connections between pages 644 in the personal reflections book database 640 and community conversations and events in the spiritual community database 440. This allows the system 100 to suggest (element 654 in FIG. 6) that a user read a community statement 448, consider a user contribution 446 to a community 444, or even start participating in a community 444 (if they are eligible) based on the content of the user's book page 644.

It is contemplated that the user will use the personal reflections book database 640 to document and contemplate their life journey, effectively creating an autobiography of their spiritual life. The user might address such questions as "who am I," "what have I struggled with in my life," "what are my life goals," and "what inspirations do I want to pass down to my children and grandchildren," with each of these topics being organized as a separate page 644 in the database 640. In one embodiment, the personal reflections book is kept confidential so that an individual's private reflections can be added to the database 640 without fear that other users will view these reflections. Because of this level of privacy, users that wish to share their contributions to the personal reflections book database 640 are encouraged to accomplish such sharing through the spiritual community database 440 and user interface 402. If the information in the personal reflections book database 640 is considered private and inwardly focused, information added to the spiritual community database 440 is considered public and outwardly focused. In this embodiment, book contributions 646 can easily be added to user contributions 446 to communities 444, but only through an explicit process that verifies that the user wishes to publicly share this information.

In another embodiment, the system 100 shares a user's contributions to the personal reflections book database 640 with others after the user's death or upon some other triggering event. In order to limit the scope of sharing after the triggering event, the user can identified particular users that will be view their contributions 646 using the descendant's database entity 656. For example, one user might name their actual descendants in this entity 656. While the user remains alive, only that user can view their entries in the personal reflections book database 640. When the descendants verify to the system 100 that the user has passed away, the system will give the descendants identified through entity 656 access to the contributions 646, 648, 650 that the user made to the personal reflections book database 640. In one embodiment, a named descendant 656 simply informs that system of the death of a user. If the user does not respond to an inquiry from the system 100 within a set time period, the triggering event will be deemed to have occurred and the user's data 646, 648, 650 will be shared. Other triggered events could be defined, such as a son or daughter turning 18, or the birth of a grandchild. In one embodiment, the named descendants have the ability to notify the system of the triggering event subject to a verifying communication attempt with the user. In other embodiments, more secure mechanisms for verifying the occurrence of a triggering event can be implemented, such as automatic monitoring of trusted databases or manual verifications of government issued certificates. In still further embodiments, triggering events are tied to the calendar, with user contributions becoming public to descendants 656 on a particular date. Of course, a user may elect to share their contributions 646, 648, 650 with all interested users of the system 100 upon the occurrence of the triggering event and not just with named descendants 656.

In order to simplify the creation of different types of pages 644 in the user interface 602, page templates 658 are provided by the database 640. In one embodiment, these templates 658 are organized by topic. Templates 658 could provide content for the user about the topic, such as a guided spiritual practice to be followed, instructions for meditation practices, or spiritual journeys or pilgrimages that may be of interest to the user. Users would use the page 644 created through these templates 658 to follow the instructions and reflect on the performance of these activities. Templates 658 could also be designed around topics for reflection such as "life goals," and then guide the user on how the topic could be addressed. The templates 658 could specify formatting a page 644, provide instructions or other information to the user, create a stub outline for commentary or reflection that could be completed by the user, and even specify the formatting to be applied to photographs and video added to the page 644 by the user.

Figure 7:
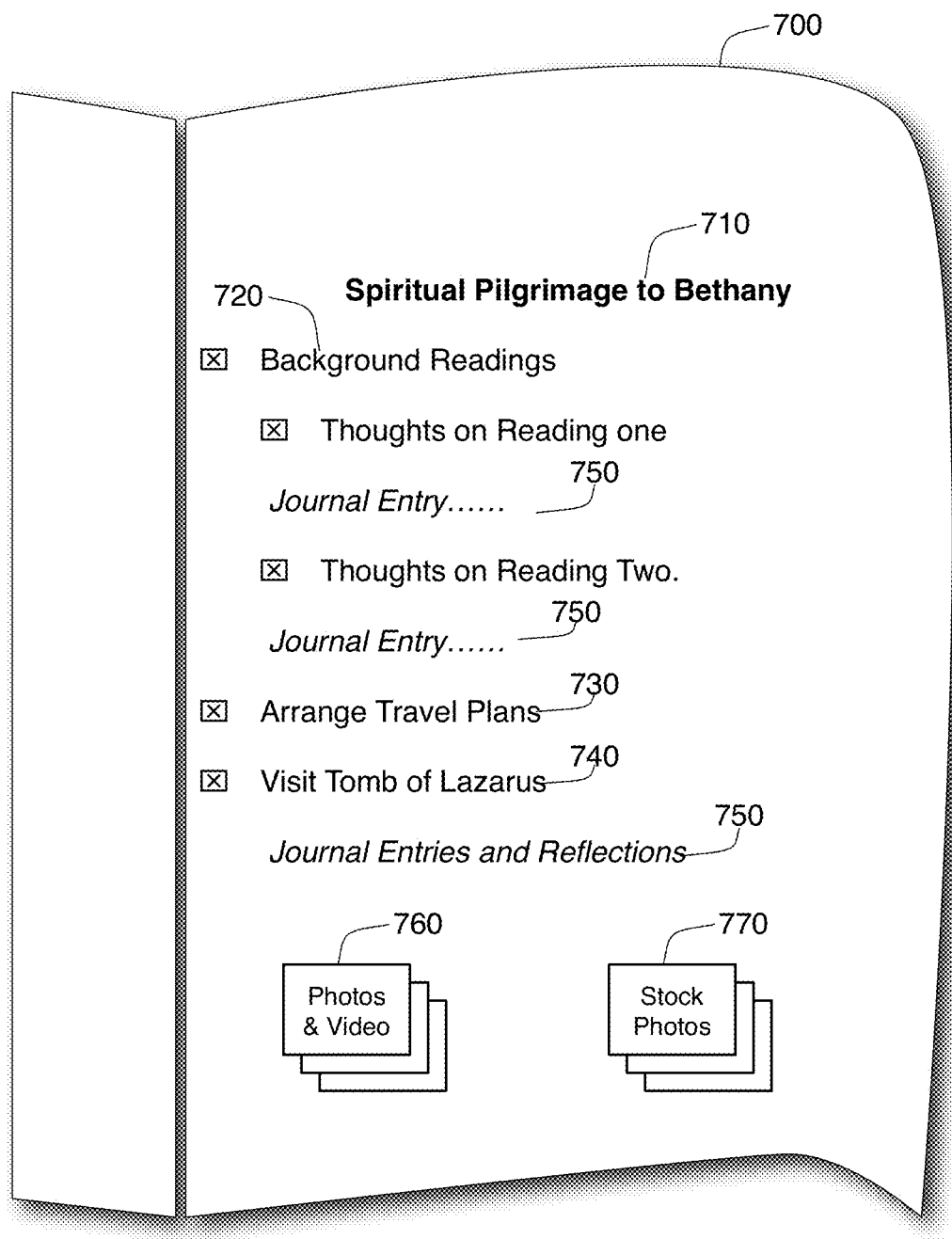
FIG. 7 is a schematic diagram showing a first page interface to the personal reflections book server.

For example, FIG. 7 shows a user interface in the form of a page 700 in the personal reflections book database 640. This user interface 700 was created through the use of a page template 658. This particular template 658 relates to a spiritual pilgrimage to Bethany in Israel, as indicated by the title 710. A user contemplating a trip to Israel could create this page 700 based on the template 658. This particular template includes suggested background-reading 720, suggests travel plans that must be made 730 and places to visit 740, and encourages journal entries and reflections 750 at each step of the process. The individual steps 720, 730, 740 can be presented as a to-do list, allowing users to track their process through the steps. In addition, the template may encourage users to add their own photographs and video content 760 to the page 700. The template 658 used to create the page 700 may include a particular method to organize and display the photographs on the page in a manner consistent with the content of the rest of the page 700. Furthermore, the template 658 could provide or suggest stock photographs 770 to supplement the user content 760. Of course, the content of the page 700 need not be static. In one embodiment, the format and presentation of the page 700 changes as the user progresses through the steps 720, 730, 740 set forth on the page 700.

Figure 8:
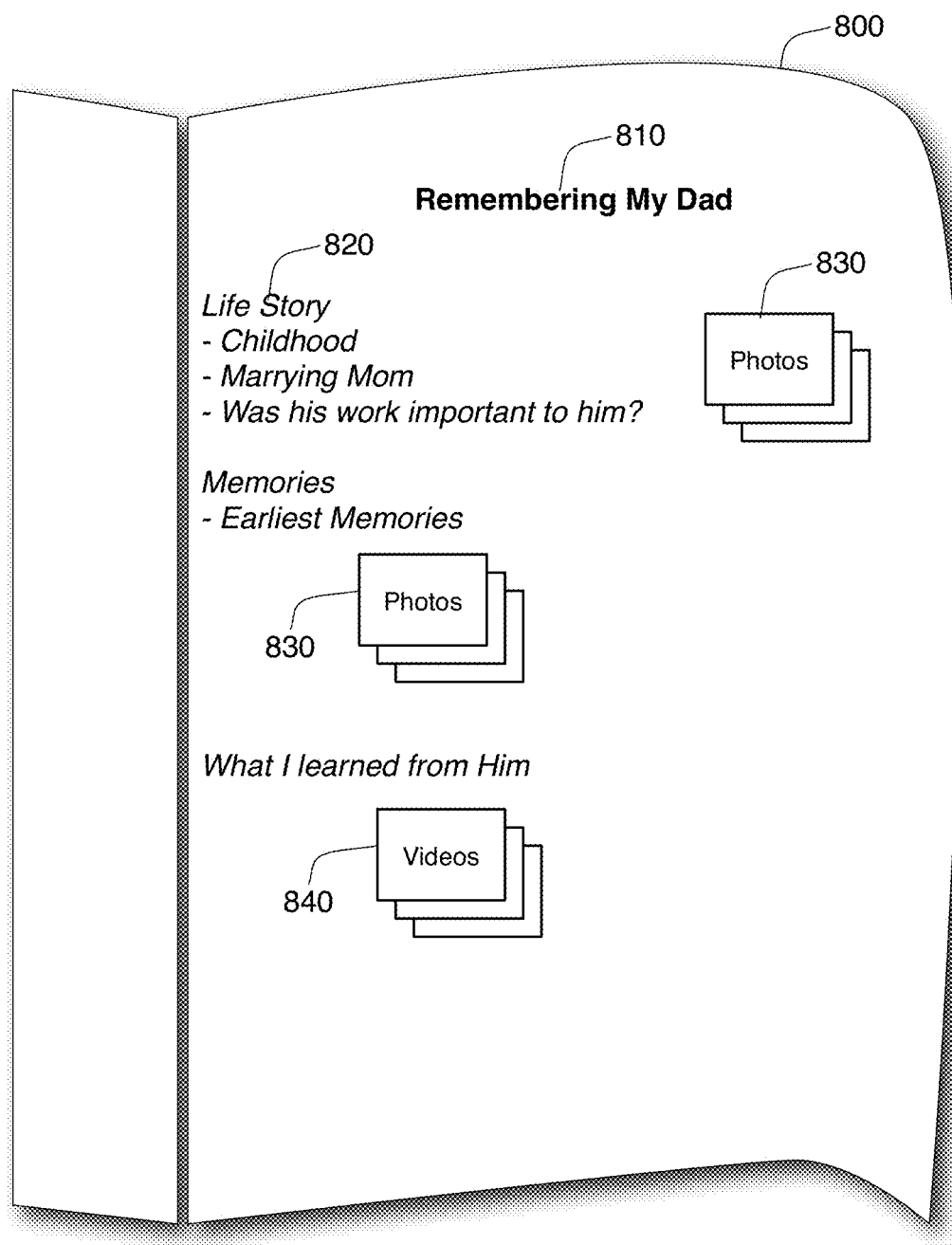
FIG. 8 is a schematic diagram showing a second page interface to the personal reflections book server.

FIG. 8 shows a separate page interface 800 created through the use of a second template 658. As reflected in the title 810, the page 800 was created with a template designed to help remember and reflect on the life of a parent. In this case, the template 658 populated the page 800 with an outline 820 that helps the user reflect on the life of their parent. The template 658 may even suggest that the user locate photos 830 of their parent to add to the outline 820. The user can fill in this outline 820, alter it, or ignore it altogether. The outline 820 could be chronological in nature (tell your father's life story), topical (what was your earliest memory of your father, or what did you learn from him), or both. Again, photographs 830 and video 840 added to the page 800 could be formatted and presented as suggested by the template 658 that formed the page 800, or the user could override these suggestions and alter the presentation of this content 830, 840.

Figure 9:
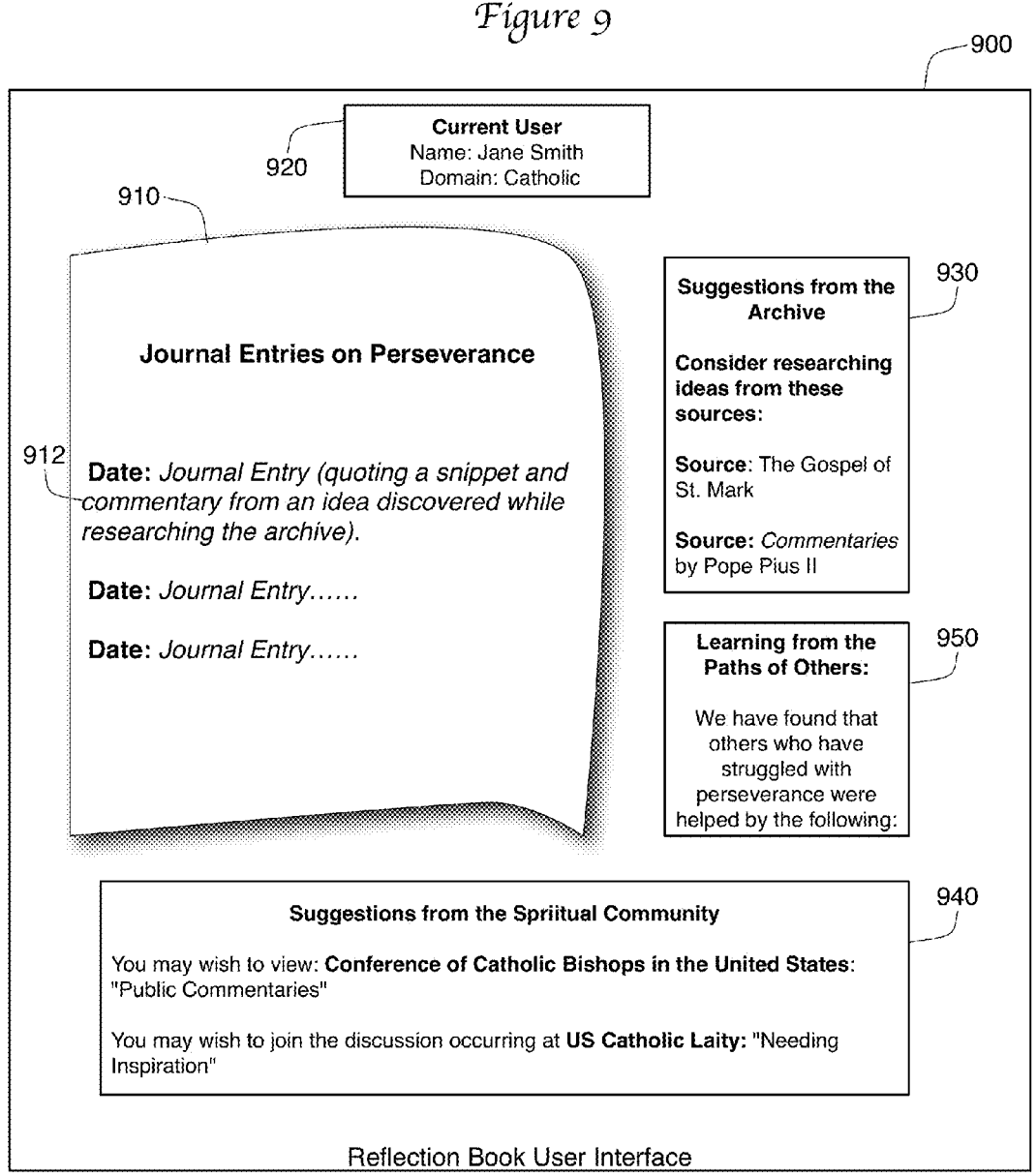
FIG. 9 is a schematic diagram showing a first embodiment of a user interface to personal reflections book server.

In FIG. 9, a user interface 900 is shown having a page 910 that contains journal entries made by a user on the topic of perseverance. In this embodiment, information about the user 920 is also shown in this interface 900, indicating that user's name is Jane Smith and that she has identified herself with the religious/spiritual domain 290 of Catholicism. Obviously, this information need not always be shown to the user during her use of the system 100. This information 920 is shown in as part of interface 900 to reveal that the user has self-selected this domain 290. In FIG. 9, the system 100 has analyzed the journal entries on page 910 and assigned one or more life issue tags 270 to these entries. These tags 270 can be self-selected by the user, identified from the template 658 used by the user to create the page 910, identified based on the ideas 280, snippets 282, or commentaries 284 from the archive that the user quoted (see item 912 on FIG. 9), or from the textual analysis for the content that the user personally entered into the journal entries on the page 910.

The life issue tags 270 assigned to the user can be used to suggest other ideas 280 from the archive database 260. In this case, a life issue tag 270 of perseverance may be assigned to this page 910. In addition, we know that Ms. Smith has identified herself with the Catholic domain 290. As a result, the system 100 may suggest at location 930 other ideas from the archive database 260 related to both this life issue tag 270 and this domain 290. In this case, the system 100 is suggesting two ideas 280, one with a document snippet 282 from the Gospel of St. Mark, and a second from *Commentaries* by Pope Pius II. At location 940, the user interface 900 is suggesting that the user review material found in the spiritual community database 440. These items could also be selected based on the life issue tags 270 assigned to this page 910 and the domain 290 self-selected by the user. In this case, the interface 900 suggest the user view a community statement 448 from a community 444 known as the "Conference of Catholic Bishops in the United States," and to participate in a community 444 known as "US Catholic Laity."

At element 950, the interface 900 is suggesting that Ms. Smith learn "from the paths of others." Because the system 100 is tracking the actions of numerous individuals from across many religious/spiritual domains 290 who are dealing with a variety of life issues 270, the system 100 will recognize patterns or paths through the system 100 that others have taken. For instance, the system 100 may recognize that others identified with the same domain 290 and dealing with the same life issue 270 appear to find meaning in a particular idea 280, actively participate in a particular community 444, and frequently undertake a particular spiritual discipline using a template 658 in the personal reflections book database 640. When the system 100 identifies these multiple elements as being frequently or successful used by other users, the elements can be suggested together as a "path" that might be taken by others of the same domain 290 dealing with the same life issue 270.

These paths 950 can be collected and analyzed according to a two-dimensional matrix formed by the domain 290 on one axis and the life issue tags 270 on another. Others who find themselves at the same location in the matrix may therefore learn from the paths through the system 100 taken by others before them. Similarly, the system 100 can use this same matrix to find suggestions for locations 930, 940. Note that because both the life issue tags 270 and the domains 290 are stored in a hierarchy, careful construction of the matrix will mean that close-by locations on the matrix may concern the same life issue 270 approached from a similar but different domain 290 (Methodist as opposed to Presbyterian), or concern the same domain 290 dealing with similar but different life issues 270 (death of a parent as opposed to death of a grandparent). This means that empty or sparse locations in the matrix may be supplemented with suggestions for nearby locations in the matrix.

Similarities between life issue tags 270 can be based upon the life issue hierarchy 272, with parent, child, and sibling tags 270 being more similar than unrelated tags 270 in the hierarchy. In embodiments where content that is assigned to a child life issue tag 270 is automatically assigned to a parent life issue tag 270, the matrix may need to be accessed multiple times in order to check the matrix for all life issue tags 270 assigned to that content. Since domains 290 can also exist within a hierarchy using the parent relationship 292, domains could be handled similarly in determining similar domains 290 and even in the assigning of parent domains 290 automatically when child domains 290 are assigned to content.

This same matrix can be used to aggregate the information gained by monitoring users of the system 100. The system 100 can identify the pathways through the databases 260, 440, 640 used by people identified in a particular domain contemplating a particular life issue (such as Catholics researching marital fidelity or Sufis researching divorce). If enough information is gathered, this information could be shared with outside researchers, and educational and spiritual institutions. For example, by closely tracking the participation of users in the archive database 260, the spiritual community database 440, and the personal reflection book database 640, the aggregated data could indicate which part of archive database 260 is most frequented by members in the numerous divorce support communities 444. The information could also indicate whether this result changes based on the domains assigned to the individual users. Furthermore, the data might indicate the result of positions taken (actions 456) by politicians on their chances of being reelected, or the result of positions (458) taken by a church community 444 on church membership. The data might could even reveal what percentage of users researching the infidelity life issue tag 270 also research the divorce life issue tag 270 within six months, and did certain paths through the archive database 240 change this outcome.

While the suggestions 930, 940, 950 are shown on interface 900 as textual suggestions, it would be within the scope of this invention to use other techniques to make these suggestions. For example, an audio guide could accompany the user through the system 100 and, when suggestions 930, 940, 950 are recognized as applicable, the audio guide could audibly make the suggestion to the user. A moving representation of an intelligent guide could also be included in the interface 900 in order to make these suggestions 930, 940, 950.

Furthermore, although the above discussion suggests making these suggestions 930, 940, 950 based primarily on the self-identified user domain 290 and the assigned life issue tags 270, other elements could be used to make these suggestions. For instance, the system 100 could monitor the user's interaction with the research archive database 260 and identify that the user had a special interest in ideas 280 having snippets 282 from a particular spiritual author. In this case, the suggestions from the archive 930 could focus on other ideas 280 with snippets 282 from the same author, even if the idea were associated with a different life issue tag 270. In this case, the life issue tag hierarchy 300 would be particularly useful. For instance, if the page 910 were associated with the life issue tag of divorce 342, and the user's favorite author had snippets 282 in ideas 280 assigned to the life issue tag of marriage 320 or relationships 310 (i.e., parent and grandparent life issue tags 270), these ideas 280 could be suggested at location 930. Similarly, each comment 284 in an idea 280 could be identified with the scholar that wrote the comment 284, and the system 100 could recognize that the user had taken a special interest in other comments 284 by that scholar. In this case, other ideas 280 with similar but not identical life issue tags 270 having comments 284 by that scholar could be suggested at interface location 930.

Finally, the techniques described to suggest content through interface 900 to users of the personal reflections book database 640 from the other databases 260, 440 could be used in other contexts. For example, the user interface 202 to the research archive database 260 could identify the domain 290 and life issue tag 270 of the idea or ideas 280 currently being reviewed in the archive database 260. Using this information, the interface 202 could suggest meditative practices, journal entries, or spiritual disciplines that the user could undertake using the personal reflections book database 640, or suggest community contributions 446, statements 448, community conversations or even entire communities 444 that may be of interest in the spiritual community database 440.

Method

FIG. 10 shows a method 1000 that might be used in connection with the described system 100. This method 1000 starts at step 1010 by providing a user interface 202 to a research archive database 260. At step 1020, the system provides a user interface 402 to a spiritual community database 440. Similarly, at step 1030 the system 100 provides a user interface 602 to a personal reflections book database 640.

After providing access to these databases 260, 440, 640, the system 100 assigns (at step 1040) life issue tags 270 to the content displayed on the user interface 202, 402, 602. This content can be user created, in which case the life issue tags 270 can be assigned using textual analysis of the user created content as described above. The content could also be pre-created, such as ideas 280 in the research archive database 260, in which case the life issue tags 270 may have been pre-assigned in the databases 260, 440, 640 before the user elected to view that content. Finally, at step 1050, the system 100 suggests to the user additional content from one or more of the database 260, 440, 640. The additional content is selected by comparing the life issue tag 270 assigned to the currently viewed content with the life issue tag 270 assigned to the suggested content. At step 1060, additional content from the databases 260, 440, 640 is suggested by comparing a domain 290 assigned to the user with a domain 290 assigned to the suggested content. Obviously, steps 1050 and 1060 can be combined such that the suggested content shares both a domain 290 and a life issue tag 270 with the content currently be viewed by the user. Additionally, as suggested above, a matrix could be created with the domain 290 on one axis and a life issue tag 270 on another axis, and the matrix location of the viewed content can be used to select the suggested content. In cases where the matrix location is empty or sparse, content for nearby locations in the matrix may be suggested instead. Finally, at step 1070, a sequence of steps is suggested to a user based on the steps taken by other users, where the suggested steps are based upon a domain 290 assigned to the user and the life issue tag 270 assigned to the currently viewed content.

The many features and advantages of the invention are apparent from the above description. Numerous modifications and variations will readily occur to those skilled in the art. For example, although the above description implies that the databases 260, 440, and 640 are completely separate databases, it would be a simple matter to implement these databases in a single, computer-implemented database system. The description of these elements as separate databases should not imply that they must exist on separate physical computing devices, or that they must be logically separated into separate database structures. Rather, this description merely means that the data found in the database 260, 440, and 640 can logically be divided into three different data collections. Since such modifications are possible, the invention is not to be limited to the exact construction and operation illustrated and described. Rather, the present invention should be limited only by the following claims.

What is claimed is:

1. A server computing machine for spiritual research, reflection, and sharing comprising:
    a) a network interface providing data and a user interface to a remote computing device over a computerized network;
    b) a processor that is controlled via programming instructions;
    c) a non-transitory computer readable memory;
    d) database programming stored on the non-transitory computer readable memory and performed by the processor, the database programming managing a database that is transformed during operation by the database programming, the database programming managing:
        i) an archive database having:
            (1) a plurality of idea database entities each having an excerpt from a spiritual document and at least one commentary about that excerpt;
            (2) a plurality of life issue tag database entities each having a life issue tag that identifies a life issue;
            (3) relationships between the idea database entities and the life issue tag database entities;
        ii) a personal reflections book database having
            (1) a plurality of user database entities each having information about and identifying a user,
            (2) a plurality of book contribution database entities each having personal reflections book content, and
            (3) relationships between the user database entities and the book contribution database entities;
        iii) a spiritual community database having:
            (1) a plurality of community database entities each having information about a community;
            (2) relationships between the community database entities and the user database entities defining membership in the communities;
            (3) a plurality of community contribution database entities each having a community contribution;
            (4) relationships between the community database entities and the community contribution database entities identifying the community for contributions.

2. The server computing machine of claim 1, wherein the server computing machine comprises a plurality of separate physical devices with separate processors, separate network interfaces, and separate non-transitory computer readable memories, the separate physical devices acting in concert as a single server computing machine according to programming instructions.

3. The server computing machine of claim 1, further comprising:
    e) user interface programming stored on the non-transitory computer readable memory and performed by the processor, the user interface programming providing a user interface to a remote user device over the network interface across a wide area network, the user interface providing to an identified user:
        i) access to the archive database by traversing a hierarchy of life issue tags and presenting idea database entities associated with a selected life issue tag;
        ii) access to the personal reflections book database by presenting personal reflections book content associated with the identified user,
        iii) access to the spiritual community database by presenting communities for which the identified user is a member, the presented communities displaying community contributions made to the community.

4. The server computing machine of claim 3, further comprising:
    f) analysis programming stored on the non-transitory computer readable memory and performed by the processor, the analysis programming directing the processor to:
        i) monitor actions of the users through the user interface relating to interaction with the database programming;
        ii) record the monitored actions of the users,
        iii) analyze the monitored actions.

5. The server computing machine of claim 4, wherein the analysis programming identifies key words in personal reflections book content added by the identified user through the user interface, compares the key words with life issue tag database entities, identifies particular idea database entities based on the comparison, and suggests to the identified user through the user interface the particular idea database entities while the identified user is accessing the book contribution database entities in the personal reflections book database.

6. The server computing machine of claim 4, wherein the analysis programming identifies key words in personal reflections book content added by the identified user through the user interface, compares the key words with life issue tag database entities, identifies relevant community database entities based on the comparison, verifies a viewing eligibility for the identified user and the relevant community database entities, and after verifying viewing eligibility, suggests to the identified user through the user interface the relevant community database entities while the user is accessing the personal reflections book database.

7. The server computing machine of claim 4, wherein the analysis programming identifies key words in community contributions made to the community when the user interface accesses the spiritual community database, compares the key words with life issue tag database entities, identifies particular idea database entities based on the comparison, and suggests to the identified user through the user interface the particular idea database entities while the user is accessing the community contribution database entities in the spiritual community database.

8. The server computing machine of claim 4, wherein the identified user is associated with a spiritual domain and further wherein the identified user is associated with a life issue tag to identify similar users with the same associated spiritual domain and life issue tag, and further wherein the monitored actions of the similar users are analyzed to suggest actions for the identified user through the user interface.

9. The server computer machine of claim 4, further comprising monitoring the community contributions to determine an event for the community, recording the event, and determining an outcome for that event at a later time.

10. The server computing machine of claim 3, wherein the personal reflections book database further contains:
 (4) a plurality of page database entities each having information about a page of content, and
 (5) relationships between the book contribution database entities and the page database entities such that each book contribution database entity is related to a single page database entity;

further wherein the user interface presents personal reflections book content by presenting personal reflections book content as pages of content.

11. The server computing machine of claim 10, wherein a first page of content comprises journal entries made by the identified user on a first topic, a second page of content comprises journal entries made by the identified users on a second topic, and the third page of content comprises media content selected by the identified user on a third topic.

12. The server computing machine of claim 10, wherein the personal reflections book database further contains:

(6) a plurality of template database entities each having a template for a page database entity,
 (7) relationships between a particular template database entity and a particular page database entity having information about a particular page, wherein the particular template database entity directs the one of the content and presentation of book contribution database entities associated with the particular page.

13. The server computing machine of claim 12, wherein the particular template database entity provides an outline of a spiritual practice for presentation on the user interface when displaying the particular page.

14. The server computing machine of claim 13, wherein the particular template database entity provides suggested actions for the identified user related to the spiritual practice and provides input for completion and comments related to the suggested actions on the user interface.

15. The server computing machine of claim 12, wherein the particular template database entity provides instructions for formatting media content for presentation on the user interface when displaying the particular page.

16. The server computing machine of claim 1, wherein the database programming restricts access to book contribution database entities to users not identified by the user database entities as being associated with the book contribution database entities, and further wherein the personal reflections book database further contains:
 (4) a plurality of descendant database entities each having information about an individual, and
 (5) relationships between the user database entities and the descendant database entities to identify descendants of users, further wherein the database programming allows access to book contribution database entities to descendants of the users associated with the book contribution database entities.

17. The server computing machine of claim 16, wherein access is granted to descendants only upon an occurrence of a triggering event.

18. The server computing machine of claim 1, wherein the database programming allows only a particular user associated with a set of book contribution database entities to access the set of book contribution database entities before a triggering event occurs, and does not restrict access to book contribution database entities after the triggering event occurs.

* * * * *